Figure 1:
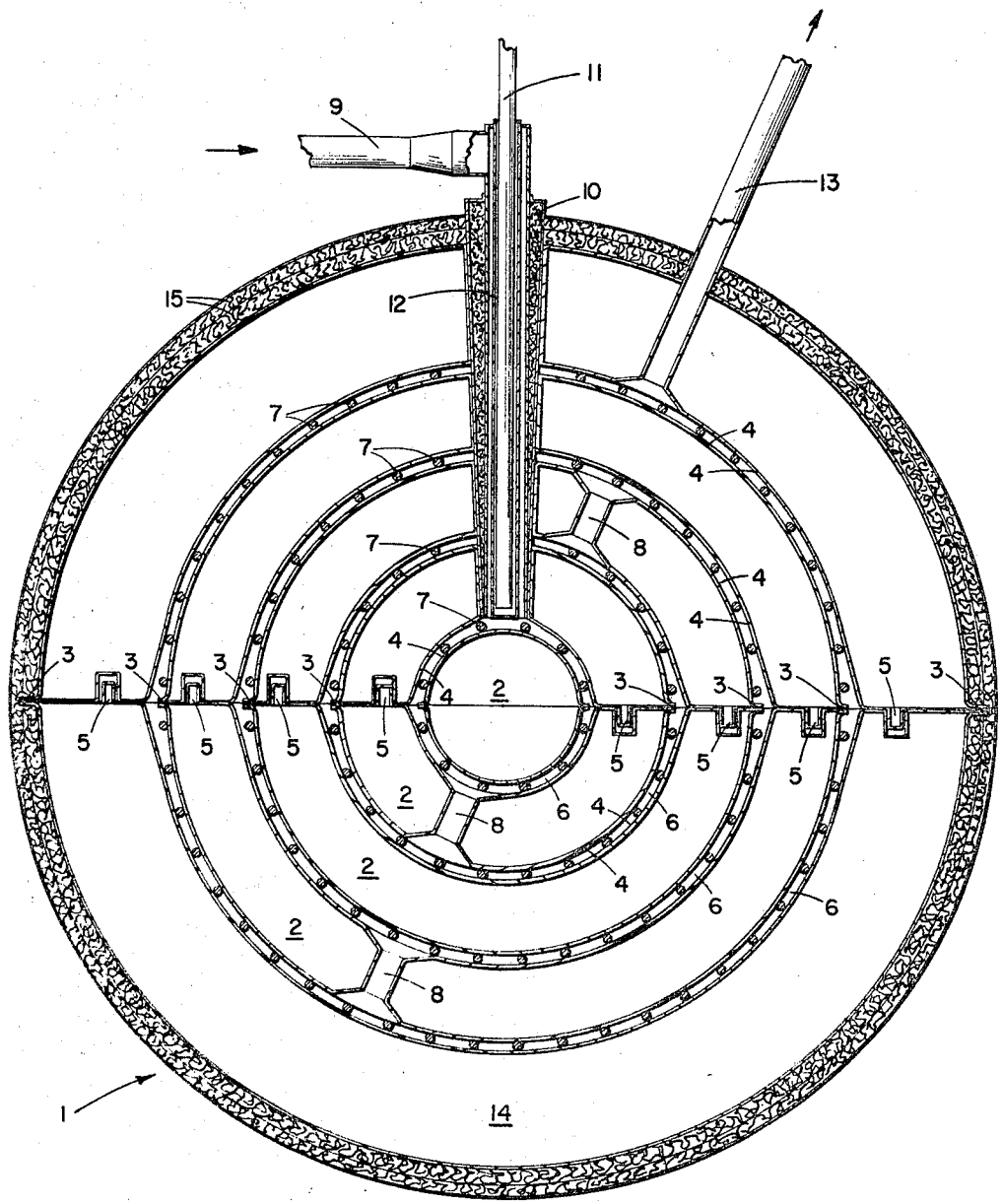

INVENTORS
Ralph Balent
Joseph R. Wetch
Emanuel Richard Cohen

ATTORNEY

United States Patent Office 3,449,208
Patented June 10, 1969

3,449,208
SMALL NUCLEAR REACTOR HEAT SOURCE
Ralph Balent, Tarzana, Joseph R. Wetch, Woodland Hills, and Emanuel Richard Cohen, Encino, Calif., assignors to North American Rockwell Corporation, a corporation of Delaware
Filed Dec. 17, 1956, Ser. No. 628,897
Int. Cl. G21c 1/26, 15/00
U.S. Cl. 176—50                                20 Claims Our invention relates to a nuclear reactor, and more particularly to an extremely small and light-weight nuclear reactor of fabricational, control and operational simplicity.

For information concerning the theory, construction and operation of nuclear reactors, reference is made to U.S. Patents 2,708,656 and 2,714,577 to Fermi et al.; Glasstone, "Principles of Nuclear Reactor Engineering," (D. Van Nostrand); "The Reactor Handbook" (3 volumes), published by the U.S. Atomic Energy Commission; Schultz, "The Control of Nuclear Reactors and Power Plants," (McGraw-Hill); and to the "Proceedings of the International Conference on the Peaceful Uses of Atomic Energy," held at Geneva, Switzerland, August 1955, and available for sale at the United Nations' Book Store, New York, New York.

Unless otherwise indicated, conventional nuclear terminology will be employed herein. For example, the "reactor active portion" or "core" is meant to designate that inner portion of a reactor which contains neutron-fissile material (U-233, U-235 and Pu) and is of such configuration as to engage in a self-sustaining chain fission reaction.

The nuclear reactors constructed to date have been extremely large and heavy. Some research reactors of relatively low power and low temperature limitation, such as the solution "water-boiler" type, have small cores; however, the associated reflector and shielding add considerably to the overall size and weight. The weight of current designs, even for the smallest reactor, runs to several tons.

As a result of the weight and bulk of prior art reactors, reactors have not been used for a whole galaxy of mobile and propulsive applications. There is a distinct need, therefore, for a small, light-weight reactor of moderate power output for advanced propulsion and mobile power systems. The reactor might also be used as a heat source for auxiliary power for recording and transmission equipment in instances where such equipment would not be subject to maintenance except at long intervals. For such applications, the reactor would substitute for batteries, large stores of fossil fuel, or solar energy devices and would have to be superior to them as regards weight, power, and reliability. Even for stationary applications, a light-weight reactor would be useful where its transportation to remote areas presents difficulties.

An object of our invention, therefore, is to provide a nuclear reactor of minimum size and weight.

Another object is to provide such a reactor wherein the reflector and moderator also serve as structural material.

Another object is to provide a small nuclear reactor which provides high coolant temperatures for thermodynamic efficiency in a small, compact, low-pressure design.

Still another object is to provide a moderator of high volumetric moderating capacity and excellent thermal and radiation stability.

Yet another object is to vary the fuel concentration in such a reactor as to achieve maximum utilization of the fissile material and minimum total reactor weight.

A still further object is to provide a low vapor pressure, high heat capacity coolant, which flows through the reactor in such a manner as to compensate for a temperature gradient across the reactor.

The above and additional objects and advantages of our invention will become apparent from the following detailed description, taken together with the accompanying drawings and the attached claims. In the drawings, FIGURE 1 is a cross-section of an embodiment of our reactor and FIGURE 2 is a graph of a typical fuel distribution pattern.

In accordance with our present invention, we have provided a small, compact nuclear reactor comprising as its active core a metal hydride moderator matrix, fissile material distributed in said core, a plurality of coolant channels distributed in said core for passage of molten metal coolant, and a reflector enclosing said moderator matrix and control means. Our reactor is extremely compact and light-weight, and yet is of sufficient power output for many applications. As contemplated, the core is about one foot in diameter and weighs about one hundred pounds without shielding. The typical design presented herein is capable of a thermal power output of approximately 100 kw. This power, however, can be considerably increased with a disproportionately small increase in size and weight. Possessing such a unique combination of small size, light-weight, low pressure, high temperature output, excellent heat transfer characteristics and reliable control, our reactor makes possible the use of nuclear power for a host of applications not previously possible.

Figure 2:
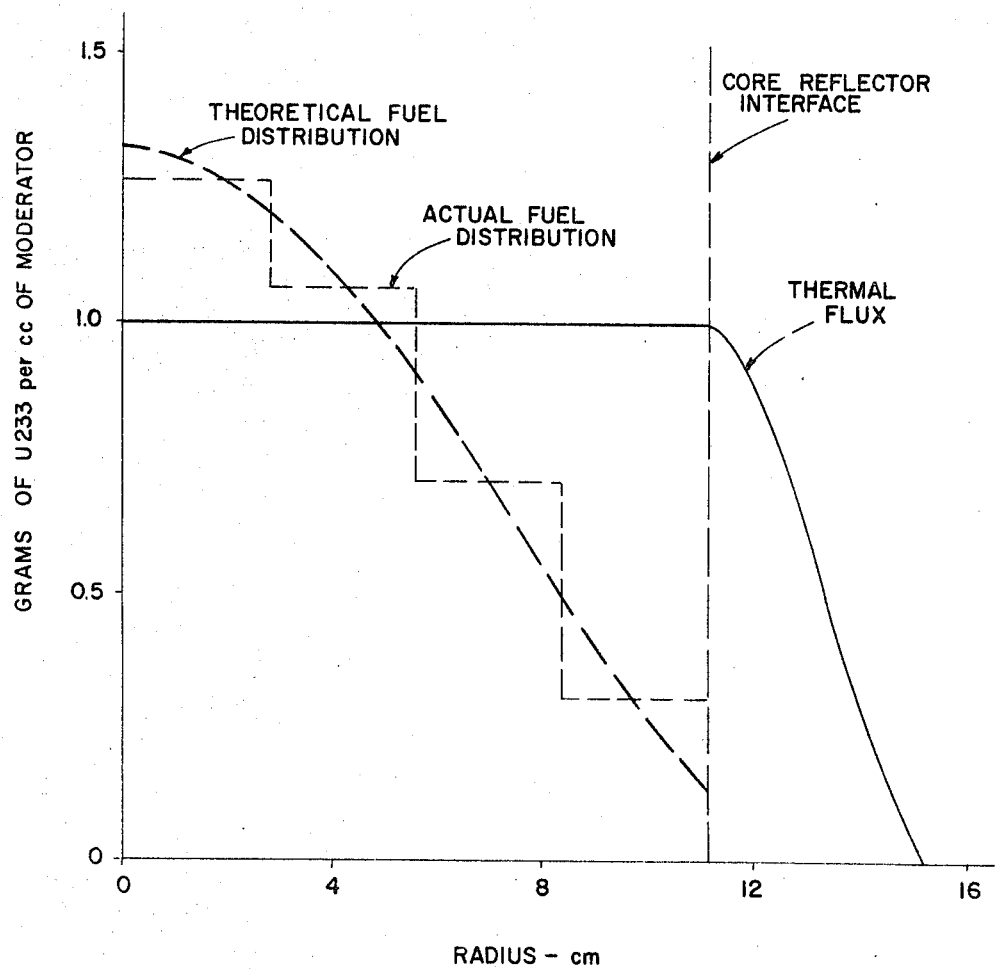

Referring to FIGURE 1, a typical reactor 1 is divided into four spherical, concentric regions 2 of fissile material-impregnated metal hydride. A cylindrical shaped core may also be used. Each spherical region may be made up of two hemispheres, joined together by welding, the closure welds 3 being indicated. Each spherical region 2 is enclosed by a metal of suitable nuclear and metallurgical properties in a molten coolant medium, all but the innermost sphere being provided with cladding 4 on both inner and outer surfaces. Regions 2 are provided with ports 5 which may be used for degassing or vacuum formation. Between each region when assembled are spherical, concentric annuli 6 for passage of the coolant. The flow around each inner sphere is channeled and the spheres are positioned with respect to one another by means of spacer wire 7, the thickness of which determines the coolant annulus width. The wire is suitably wound around clad spheres 2, and tack welded thereto. Connecting tubes 8 join the various annuli to conduct coolant between annuli 6. The coolant, a molten metal medium, is introduced into the innermost annulus through an inlet line 9 enclosed by thermal insulation 10 which may be, for example, metal foil, graphite, or graphite wool. A control rod 11 is located in inlet line 9 and the inlet coolant flows through the annulus 12. In this manner, the coolant, at its lowest temperature, is contacted with the highest specific power portion of the core. The coolant is then pumped by means of a suitable pump (not shown), such as a frozen shaft seal centrifugal pump, a pulsating hermetically sealed diaphragm pump, a canned rotor centrifugal pump, or an electromagnetic pump through the succeeding, outer annuli and withdrawn through an exit line 13 to a suitable reactor coolant-to-working fluid external heat exchange, for instance, a sodium to mercury heat exchanger (boiler and superheater). The outermost concentric ring of reactor 1 is a spherical reflector 14 of a metal hydride or beryllium metal and is joined to the core by spiral wire spacers 7 and external peripheral weld 3. Surrounding the reflector are several layers 15 of an insulator for thermal insulation of reflector 14. Combinations of thin metal foil may be used. For example, the very thin inner layer is suitably stainless steel foil and the outer layers may be aluminum foil.

The moderator comprises at least one metal hydride or metal alloy hydride of low density (for minimum weight), high volumetric hydrogen density, low thermal neutron absorption cross-section and excellent metallurgical characteristics from a stability, thermal shock, and heat transfer viewpoint. Operation with a molten medium at elevated temperatures (e.g., approximately 1200° F.) is permissible with this core. Examples of satisfactory hydrides meeting these requirements are the hydrides of yttrium, titanium, zirconium, lithium-7, nickel, scandium, molybdenum, lanthanum, cerium and calcium. Certain of these hydrides may be satisfactorily alloyed in varying percentage compositions. For example, satisfactory alloys include yttrium-titanium hydride, nickel-zirconium hydride, yttrium-zirconium hydride, and zirconium-molybdenum hydride. Several suitable specific compositions of these alloys are, by weight, approximately: 10% $YH_2$+90% $TiH_2$, 2% $NiH_3$+98% $ZrH_2$ and 10% $YH_2$+90% $ZrH_2$. In comparing the zirconium-yttrium and titanium-yttrium hydrides, the titanium-yttrium alloy hydride has a very large hydrogen density ($8.77 \times 10^{22}$ atoms/H cc. at 1100° F.) and leads to a very small core size. For outlet temperatures of about 1400° F., the 10% $YH_2$+90% $ZrH_2$ alloy appears more suitable since it has low higher hydrogen density at the elevated temperature. It suffers, however, from a weight disadvantage in having a density of about five to six grams per cc., as compared to about four grams per cc. for the yttrium-titanium alloy hydride; however, its absorption cross-section is smaller, and a slightly smaller critical mass is found. The metal hydrides are commercially available or may be fabricated by direct hydrogenation of solid metal or alloy compositions at elevated temperatures (about 1200° F. to 1500° F.). For permanent type installation or high-powered reactors, the fuel would not necessarily be impregnated into the moderator but could be in a fixed solid form in pins or rods as a metal, oxide, carbide, or alloy, separated from the moderator in order to form a heterogeneous-type reactor. In this way the fissile material may be removed and replenished without disturbing the moderator structure. In this type of application, the reactor may be cylindrical to facilitate solid fuel removal.

The fissile material selected for our reactor is determined by reactor weight and cost. When uranium is used, it is preferably highly enriched, say, at least 90%, in one of the thermal neutron-fissile isotopes in order to reduce size and weight. Uranium-233 appears to be the most satisfactory of the three available fissile isotopes. The critical mass utilizing U-233 is less than that required when utilizing U-235, which may compensate for its additional cost, and it results in a reactor of reduced volume and weight. The use of plutonium will also reduce the critical mass over U-235 but does not reduce the critical size significantly and may also add to control problems due to the smaller delayed neutron fraction.

The reflector may satisfactorily include the above metal hydride compositions. Of these compositions, we find that the lighter weight reflectors comprise calcium hydride, calcium hydride-calcium, and lithium-7 hydride, but beryllium metal, because of its availability and relative ease of fabrication, is preferred. Lithium-7 may either be purchased commercially or separated from the high cross-section lithium-6 isotope by methods known in the literature such as ion exchange, electromagnetic means (calutrons) and chemical exchange techniques between immiscible fluid media. Even though the scattering cross-sections for calcium and lithium-7 are very low and their hydrides have a lower hydrogen content than the preferred core materials, they appear to be the best light-weight reflectors other than beryllium because of their very low densities of 1.78 grams/cc. and 0.78 gram/cc. and low hydrogen dissociation pressures. A typical calcium reflector comprises approximately 95% $CaH_2$+5% Ca, by weight. Where stationary applications are contemplated or radiation is a hazard, the core may be shielded by conventional shielding materials, such as heavy concrete aggregate, and cadmium, boron, lithium, and rare earth compositions.

The lining material for each of the moderator regions of the core is important for a number of reasons. The metal forms the lining of the coolant ducts and so must be corrosion, oxidation, erosion and otherwise metallurgically stable in the molten coolant at an elevated temperature. It must also possess a low or moderate neutron absorption cross-section for neutron economy reasons. Another very essential requirement is that the metal be relatively impermeable to hydrogen diffusion at elevated temperatures. The metal hydrides tend to dissociate to some extent at elevated temperature and the container material should greatly reduce hydrogen escape, which would result in loss of moderating capacity. Molybdenum is preferred for this application. It is stable in oxygen-free molten media, possesses satisfactory nuclear characteristics, and along with aluminum and copper has the lowest permeability ($3.3 \times 10^{-2}$ cc./cm.$^2$/hr./mm. at 760 mm. and 1290° F.). Molybdenum also possesses the necessary elevated temperature strength. Stainless steel, especially oxidized 300 series steels such as type 316 or 347 stainless steel, is also satisfactory, as are other non-ferrous chromium alloys such as the chromium-nickel alloys. Stainless steel, after treatment with wet hydrogen and steam to produce an oxide coating, yields a diffusion rate of only $2 \times 10^{-3}$ cc./cm.$^2$/hr./mm. at 1318° F. and is preferably used in this form. Using the molybdenum or treated stainless steel, the hydrogen loss from a zirconium hydride core would be less than 1% per year, which is highly satisfactory. Aluminum oxide and various vitreous silica glass and ceramic coatings on the moderator side of the cladding show promise for reducing hydrogen permeability at elevated temperatures.

The coolant is a molten metal medium of low vapor pressure. Satisfactory coolants comprise at least one molten fluid selected from the following group: lithium-7, sodium, potassium, sodium-potassium, bismuth, bismuth-tin, lead, lead-bismuth, and mercury.

The thermal flux pattern across the core of nuclear reactors has heretofore been uneven, with the highest thermal flux appearing at the center of the core with smaller values at the boundaries. To reduce this, reflectors, central poisoning and fringe enrichment have been used, but the flux at the fuel reflector-boundary interface is still smaller than at the center. This results in unequal fuel utilization, higher critical mass and core size, and more frequent fuel changes. For small, mobile, long-life reactors, it is necessary that there be maximum utilization of the fissionable material in order to minimize the critical mass and total weight and extend the period of operation. We accomplish these objectives by non-uniform distribution of the fuel across the reactor core, with a heavier concentration at the center and decreasing peripheral concentration. Although this results in a still higher fast flux at the center of the core, there is a greater absorption of thermal neutrons due to the presence of larger amounts of fissile material and so the thermal flux is substantially flat across the core. FIGURE 2 is a graph showing a fuel distribution pattern, in terms of grams of fissionable material per cc. of moderator, across the core in order to achieve flat thermal flux. The conditions from which this curve is derived are as follows: fuel, U–233; moderator, 90% $ZrH_2$+10% $YH_2$; reflector, $CaH_2$; critical mass, 2.87 kg. U-233; peak fuel concentration, 1.322 grams cm.$^3$; average fuel concentration, 0.515 gram cm.$^3$; and peak to average concentration, 2.56. This curve will, of course, vary with different parameters, but the general shape, that of the negative slope, will be characteristic of all uniform fuel utilization loadings of this type with fully enriched material. Practically it is not convenient to continuously vary the fuel concentration; therefore, the core has been divided into discrete regions of different fuel concentration and the continuous distribution is approximated as shown by the squared-off regions of the graph. For fabricational convenience, each of the separate spherical regions of the core will be of the same fuel concentration.

Several methods of control may be used for this reactor. Control of the reactor can be accomplished by means of a single control rod 11 penetrating to the core center through coolant inlet line 9. The rod may suitably consist of a high thermal neutron absorption cross-section material such as hafnium, gadolinium, samarium, lithium, boron, and boral (boron carbide-aluminum alloy), a boron steel rod being preferred.

Another method of control may be by reflector movement in order to change the neutron leakage from the core. On such small reactors more neutrons leak out than are parasitically absorbed; thus, leakage control appears attractive. In a distributed fuel reactor such as the present one, reflector control is more predictable and can be designed to minimize flux and power distortion. Reflector control can also be entirely external to the core, thus simplifying core fabrication. Typical reflector control would be accomplished by a plurality of rotating cylinders in the reflector. The cylinder might possess two faces, one having a neutron absorber and the other reflector material; or the cylinder might be divided into three faces, the above two plus a third containing reflector and fuel for maximum reactivity.

For most purposes it is desirable to maintain the reactor at a constant, fixed power level. This facilitates operation of the control means. The flux level may be easily determined by the standard monitors such as boron trifluoride pulse chambers, the signal transmitted through a conventional control circuit to servo motors which drive the control rods or rotate the control cylinders. Conventional control instrumentation, which are applicable here, are described in the co-pending applications of the common assignee, S.N. 586,840, filed May 23, 1956, in the names of J. R. Wetch et al. for "Organic Reactor," now abandoned and S.N. 607,929, filed Sept. 4, 1956, in the name of J. W. Flora for "Low Cost Nuclear Research Reactor," now Patent No. 2,937,127 and the Schultz reference, supra.

The core may be formed in the following manner: metal alloy ingredients, plus the fissile material are arc melted at 1200–1500° F. in vacuum in a hemispherical mold. Any gases liberated from the metals are purged with an inert gas. After this, the molten material is massively hydrided by introducing hydrogen gas until no further hydrogen absorption is measured. The resulting metal hydride alloy, impregnated with the fissile material, is then cooled to the ambient temperature. The fissile material might also be introduced into the hydride matrix by various impregnation methods such as hot pressing powders. The hydride may also be obtained commercially.

The cladding for each hemispherical portion may be applied in various manners. In one method, the cladding metal is placed over the hydride composition, the space thereinbetween evacuated, and molten sodium or sodium-potassium added under pressure to provide a thermal bond between the cladding and hydride. The hemispherical portions of each concentric region are then formed into spheres by welding. In another method the cladding metal is applied and the thermal bond between the cladding and hydride made by inserting very thin (e.g., 5 mil) suitable metal foil such as niobium and/or molybdenum between the cladding and hydride. The resulting composition is then hot pressed at approximately 1600° F. to yield a thermal bond and the hemispheres joined by welding, as previously. In a third method the metal alloy is machined before hydriding to approximately 10% less than the final desired dimensions. The composition is then loosely covered with niobium foil and the cladding put in a form and therein hydrided. The alloy expands slightly greater than 10% in hydriding, thereby forming a thermal bond to the niobium or other foil material.

Each resulting spherical region is then wrapped with a spiral wrapping of a material suitable for the cladding, the ends of the wrapping being tack-welded to the cladding and the spherical regions assembled into the reactor core.

Depending upon the principal desired characteristics of the reactor, that is, minimum total weight, or minimum total cost, the parameters of the reactor core will vary. For example, Table I, below, compares cost total weight for different moderators and fuel combinations. This table was made for an orbital application and the costs represent only material costs plus $2,000/lb. to place the total mass in the orbit.

TABLE I.—SUMMARY OF REACTOR RESULTS

| Fuel | Moderator [2] | Minimum total weight (lbs) | Radius for minimum total wt. (cm). | Minimum cost ($2,000/lb.) | Radius for minimum cost ($2,000/lb.) (cm.) |
|---|---|---|---|---|---|
| $U^{235}$ [1] | 90% $ZrH_2$+10% $YH_2$ | 146 | 15.75 | $370,000 | 17 |
| $U^{233}$ | 90% $ZrH_2$+10% $YH_2$ | 108 | 14.25 | 315,000 | 15.5 |
| $U^{235}$ | 90% $TiH_2$+10% $YH_2$ | 120 | 14.5 | 415,000 | 16.75 |
| $U^{233}$ | 90% $TiH_2$+10% $YH_2$ | 90 | 13.75 | 380,000 | 15.75 |

[1] $U^{235}$ at $20/gm. and $U^{233}$ at $36/gm.
[2] All $CaH_2$ reflected.

As a specific example of our invention, the following complete reactor design is offered, as summarized in Table II, below.

Table II.—Reactor data

Power output (thermal kilowatts) 100.
Endurance _____ 1 year at full power.
Total reactor weight (less auxiliaries) _____ 100 pounds.
Total reactor diameter (over reflector) _____ 11.81-inch sphere.
Reflector _____ 1.53 inches, 95% $CaH_2$+5% ca.
Core _____ 8.65-inch diameter.
Moderator _____ 10% $YH_2$+90% $ZrH_2$ (10 Mil Mo Cladding) (80 Mil Mo wire wrapping).
Fuel _____ 2.9 kilograms $U^{233}$.
Coolant _____ Liquid sodium.
Inlet temperature _____ 700° F.
Outlet temperature _____ 1200° F.
Flow rate _____ 1.1 g.p.m. 20 thermal kw.
Pressure drop _____ 0.8 p.s.i.
Pumping requirement thru reactor (10% pump efficiency) _____ 4 watts.
Pump weight (centrifugal) _____ 10 pounds.
Heat transfer area _____ 900 in.$^2$.

Nuclear Data (1) Core two group constants
  Thermal neutron flux at 20 kw. _____ $1.7 \times 10^{11}$n./cm.$^2$sec.
  Age _____ 19.30 cm.$^2$.
  $L^2_{th}$ _____ 9.89 cm.$^2$.
  $\Sigma_{fast}$ _____ 1.373 cm.$^{-1}$.
  $\Sigma_{th}$ _____ 0.01718 cm.$^1$.
  $\eta$ _____ 2.31.
(2) Reflector
  Age _____ 60.6 cm.$^2$.
  $L^2_{th}$ _____ 19.75 cm.$^2$.
  $\Sigma_{fast}$ _____ 0.932 cm.$^{-1}$.
  $\Sigma_{th}$ _____ 0.01290 cm.$^{-1}$.

The above example is merely illustrative and is not restrictive of our invention. It is expected that engineering changes may be made by those skilled in the art that will fall within the scope of our invention. Our invention, therefore, should be limited only as is indicated by the appended claims.

Having thus described our invention, we claim:

1. A small nuclear reactor comprising a core including an assembly of a plurality of members, each member consisting essentially of a solid metal hydride moderator matrix and a fissionable material, each of said members being enclosed with a relatively hydrogen-impermeable lining, a liquid metal coolant, a plurality of coolant channels passing through said core for passage of said coolant, said coolant channels being defined by said members, and reflector means substantially surrounding said core.

2. The reactor of claim 1 wherein said metal hydride matrix comprises at least one metal hydride composition selected from the group consisting of zirconium hydride, yttrium hydride, titanium hydride, lithium-7 hydride, cerium hydride, nickel hydride, and molybdenum hydride.

3. The reactor of claim 1 wherein said metal hydride matrix is zirconium hydride and said coolant includes sodium.

4. The reactor of claim 1, wherein said metal hydride matrix is an alloy selected from the group consisting of zirconium-yttrium hydride, titanium-yttrium hydride, zirconium-nickel hydride, and zirconium-molybdenum hydride.

5. The reactor of claim 1, wherein said metal hydride matrix is selected from the group consisting of approximately 90% zirconium-10% yttrium hydride, by weight, and approximately 90% titanium-10% yttrium hydride, by weight.

6. The reactor of claim 1, wherein said reactor is cooled by at least one molten metal selected from the group consisting of alkali metals, bismuth, bismuth-tin, lead and lead-bismuth.

7. The reactor of claim 1, wherein said fissile material is impregnated in said metal hydride matrix.

8. The reactor of claim 1 wherein said metal hydride is zirconium hydride and said fissionable material is uranium.

9. The reactor of claim 1 in which said hydrogen impermeable lining comprises a stainless steel jacket, said reflector is beryllium, and said liquid metal is sodium.

10. A nuclear reactor comprising as its core a plurality of concentric regions, each of said regions being composed of a fissile material-impregnated metal hydride matrix, the fissile material concentration in each of said regions being equal, the fissile material concentration between each of said regions decreasing from the center to the periphery of said core, so as to achieve a substantially flat thermal flux pattern; a liquid metal corrosion-resistant metal cladding on each of said concentric regions, a wire wrapping of said metal on each of said regions, said cladding and said wrapping defining coolant ducts for passage of molten metal coolant; a contiguous reflector enclosing said concentric regions; and reactor control means associated with said core.

11. The reactor of claim 10, wherein said metal hydride matrix is at least one metal hydride selected from the group consisting of zirconium hydride, yttrium hydride, titanium hydride, calcium hydride, lithium-7 hydride, cerium hydride, nickel hydride and molybdenum hydride.

12. The reactor of claim 10, wherein said metal hydride matrix is an alloy selected from the group consisting of zirconium-yttrium hydride, titanium-yttrium hydride, zirconium-nickel hydride and zirconium-molybdenum hydride.

13. The reactor of claim 10, wherein said molten coolant is selected from at least one of the group consisting of sodium, sodium-potassium, lithium-7, bismuth, bismuth-tin, lead and lead-bismuth.

14. The reactor of claim 10, wherein said coolant ducts are composed of a metal selected from the group consisting of stainless steel and molybdenum.

15. A nuclear reactor comprising as its active core a metal hydride moderator matrix selected from the group consisting of zirconium-yttrium hydride and titanium-yttrium hydride, fissile material impregnated in said matrix in radially-diminishing concentraton of fixed increments, a plurality of communicating concentric, coolant ducts composed of a metal selected from the group consisting of molybdenum and stainless steel for the passage of molten metal coolant; an enclosing, contiguous reflector selected from the group consisting of calcium hydride, calcium hydride-calcium and beryllium; and control rod means extending into said core.

16. The reactor of claim 15, wherein said coolant ducts divide said core into a plurality of regions, said regions defining said fixed increments of fuel concentration.

17. A nuclear reactor comprising a spherical core of a fissile material impregnated metal hydride matrix selected from the group consisting of approximately, by weight, 90% zirconium hydride-10% yttrium hydride and 90% titanium hydride-10% yttrium hydride; an enclosing, contiguous beryllium reflector provided with exterior thermal insulation; a plurality of communicating, concentric, annular coolant ducts through said core for passage of molten sodium coolant, a coolant inlet duct entering the innermost of said coolant ducts, a coolant withdrawal duct leaving the outermost of said ducts, said ducts being composed of molybdenum, said coolant ducts dividing said core into a plurality of regions; the fissile material concentration within each of said regions being equal, the fissile material concentration between said regions decreasing radially so as to achieve a substantially flat thermal flux pattern; and a control rod positioned in said coolant inlet line.

18. A nuclear reactor comprising as its core a plurality of concentric spheres, said spheres being composed of uranium impregnated metal hydride matrix, said metal hydride matrix being selected from the group consisting of approximately 90%! zirconium-10% yttrium hydride, by weight, and approximately 90% titanium-10% yttrium hydride, by weight; the uranium concentration in each of said spheres being equal, the concentration between each of said spheres decreasing radially, so as to achieve a substantially flat thermal flux pattern; molybdenum cladding on each of said spheres, a spiral molybdenum wire wrapping on each of said clad spheres, said cladding and said wrapping defining connecting, concentric, annular coolant ducts for passage of molten sodium coolant; a molybdenum coolant inlet duct entering the innermost of said coolant ducts, a molybdenum coolant withdrawal duct leaving the outermost of said ducts; a contiguous beryllium reflector enclosing said hydride spheres; and a control rod positioned in said coolant line.

19. A small nuclear reactor comprising a core including an assembly of a plurality of members, each of said members having a fuel-moderator portion, said portion consisting essentially of a solid metal hydride moderator matrix and a fissionable material, said members being distributed in a plurality of concentric regions in said core and said fissionable material concentration varying from one region to the other, said concentration being greatest at the center of said core and smallest at the periphery of said core; means enclosing said fuel-moderator portion for preventing the diffusion of hydrogen from said members; a plurality of coolant channels passing through said core; a coolant in said channels; and reflector means substantially surrounding said core.

20. The nuclear reactor of claim 19 wherein said fissionable material concentration within each region is uniform and the concentration decreases in steps from the center to the periphery of said core.

(References on following page)

References Cited

UNITED STATES PATENTS

| | | | |
|---|---|---|---|
| 2,774,730 | 12/1956 | Young | 204—154.2 |
| 2,837,475 | 6/1958 | Newson | 204—154.2 |
| 2,894,891 | 7/1959 | Grebe | 204—154.2 |

FOREIGN PATENTS

| | | |
|---|---|---|
| 648,293 | 1/1951 | Great Britain. |

OTHER REFERENCES

Reactor Handbook, vol. 2, A.E.C.D. 364, May 1955. Available from A.E.C. Technical Information Service, Oak Ridge, Tenn., pages 804, 805, 809.

Nucleonics, November 1956, pp. 146–153.

A.E.C.D. 4095, April 1950, pp. 3–12, 24–27. Available from AEC, as above.

REUBEN EPSTEIN, *Primary Examiner.*

U.S. Cl. X.R.

176—21, 41, 69, 92